United States Patent
Renaud et al.

(10) Patent No.: US 12,345,722 B1
(45) Date of Patent: Jul. 1, 2025

(54) LIQUID HANDLING CALIBRATION DEVICE AND ASSOCIATED METHOD OF CALIBRATION

(71) Applicant: UniPix Sàrl, Préverenges (CH)

(72) Inventors: Philippe Renaud, Préverenges (CH); Daniel Bertrand, Anières (CH); Andreas Möller, Tübingen (DE); Karl-Heinz Boven, Wannweil (DE)

(73) Assignee: UNIPIX SÀRL, Preverenges (CH)

( * ) Notice: Subject to any disclaimer, the term of this patent is extended or adjusted under 35 U.S.C. 154(b) by 0 days.

(21) Appl. No.: 19/006,930

(22) Filed: Dec. 31, 2024

(30) Foreign Application Priority Data

Apr. 25, 2024 (EP) .................................... 24172380

(51) Int. Cl.
*G06F 11/30* (2006.01)
*B01L 3/02* (2006.01)
(Continued)

(52) U.S. Cl.
CPC ........ *G01N 35/00693* (2013.01); *B01L 3/021* (2013.01); *G01N 35/1016* (2013.01)

(58) Field of Classification Search
CPC .......................... G01N 35/00693; B01L 3/021
See application file for complete search history.

(56) References Cited

U.S. PATENT DOCUMENTS 3,962,916 A * 6/1976 Bouchy .................... G01F 17/00
73/149
8,561,459 B2 10/2013 Caldwell et al.
(Continued)

FOREIGN PATENT DOCUMENTS

EP 3608640 A1 2/2020
JP S61232833 A 10/1986

OTHER PUBLICATIONS

D Bonzon et al., "Micropipette calibration by differential pressure measurements", Measurement Science and Technology, vol. 30, No. 10, Aug. 8, 2019, 10 pages.
(Continued)

*Primary Examiner* — Phuong Huynh
(74) *Attorney, Agent, or Firm* — NIXON & VANDERHYE

(57) ABSTRACT

The invention is achieved by a volumetric displacement calibration device (1) configured to be able to adapt at least one suction system (1000), comprising a tip (1006), having a volume VP, connected to a shaft (1003) comprising a volume change mechanism (1002). The device (1) comprises at least one main chamber (10) and one reference chamber (20), connected by a conduct (100) and a valve (102) to said main chamber (10) and at least one first pressure sensor (12) connected to said main chamber (10). The device (1) comprises also a second pressure sensor (22) connected to said reference chamber (20). The pressure sensors and calculation means allow to calculate an internal volume Vo, being the sum of the volume VP of said aspiration tip (1006), the volume (1005) of the shaft (1003) when the volume change mechanism (1002) is down.

The invention is also achieved by a system (2) comprising the device (1) and at least one suction system ($1000_1$-$1000_n$) adapted to said device (1).

The invention relates also to a calibration method of a volumetric fluid handling system (2) and comprising successive steps (a-m) to determine said volume Vo.

16 Claims, 11 Drawing Sheets

(51) Int. Cl.
    *G01N 35/00*     (2006.01)
    *G01N 35/10*     (2006.01)

(56)     References Cited

U.S. PATENT DOCUMENTS

2010/0286932 A1* 11/2010 Caldwell .............. G01F 22/02
    702/55
2012/0240663 A1* 9/2012 Feldmann ............ B01L 3/0217
    73/40.5 R

OTHER PUBLICATIONS

Webpage: Brandtech, Pipette leak testing units PLT unit, printed Dec. 31, 2024, 4 pages, at URL: https://www.brandtech.com/product/plt-pipette-leak-testing-unit/.
Webpage: AND, AD-1690 Leak Tester, printed Dec. 31, 2024, 2 pages, at URL: https://www.aandd.jp/products/test_measuring/pipette/ad1690.html.
Extended European Search Report for EP24172380.8, dated Oct. 16, 2024, 5 pages.

\* cited by examiner

LIQUID HANDLING CALIBRATION DEVICE AND ASSOCIATED METHOD OF CALIBRATION

CROSS-REFERENCE TO RELATED APPLICATIONS

This application claims priority to European Patent Application No. 24172380.8 filed Apr. 25, 2024, the entire contents of which are hereby incorporated by reference.

TECHNICAL FIELD

The invention relates to the field of handling liquid and solid substances more particular to a method of calibrating aspired volumes of liquids and/or solid substances. The invention relates also to a volume calibration device and a system configured to calibrate the volume of aspired substances, such as liquids, and a system which is suitable to carry out the method.

BACKGROUND OF THE ART

The precise measurement of the volume of aspired and/or dispensed liquid, solid or gaseous substances is important in several fields, in particular in the field of chemistry and biology in which the aspired volumes are most of the time small, typically less than 1000 μl. Today's standard calibration methods for laboratory suction devices, such as pipettes, is mainly based on a gravimetrical method which comprises the precise weighting of the dispensed liquid by the laboratory precision scale. The majority of pipettes on the market have full range displacement comprised 10 μl and 1000 μl. Most common categories are 10 μl, 20 μl, 100 μl, 200 μl and 1000 μl.

Alternatively, calibration of liquid dispenser can be performed using the principle of dilution of a colored or fluorescent solution into a known volume of water. The dilution methods require the use of well-characterized test solutions and known and precise volume of solvent sample. It also requires a very accurate optical sensing device that needs itself regular calibration.

The specifications of laboratory liquid handling devices, such as pipettes, are guided by the norm ISO 8655. This norm imposes a systematic error typically below 1% of displacement and a random error below 0.4% for maximal range of the pipette. These error values can be higher for small volumes. The required precision for the measurement of volumetric displacement is in the order of 0.1 μl. This imposes (density of water) an accuracy of 0.1 mg in weighting the substance, typically a liquid. The calibration process requires: 1) an accurate scale, 2) compensation of errors due to temperature, 3) avoiding evaporation of liquid and 4) a series of very careful manipulations.

The users of laboratory pipettes, depending on their accuracy constraints, must regularly check and calibrate their pipettes. As the calibrations need specific skills, the users often subcontract this task to external service providers. The cost of calibration is therefore a non-negligible part of the cost of ownership of laboratory pipettes.

The majority of existing or disclosed products are based on laboratory scales and require very careful handling and weighting of liquids. There exist at least two products called "pipette testers" that are based on the measurement of the leak rate when the pipette is pressurized and which are described in the following internet references 1-2:

https://www.brandtech.com/product/plt-pipette-leak-testing-unit/
https://www.aandd.jp/products/test_measuring/pipette/ad1690.html The leak checking allows the rejection of leaky pipettes, but is not a measurement of the volumetric precision, as it is required by the ISO 8655. Therefore, the gravimetric calibration method is still needed to qualify the pipettes.

The document US2012/0240663 describes a method for leak-testing hand-held piston strike pipettes and an associated leak-testing apparatus. The system and method described in US2012/0240663 allows to detect leakage in single-channel and multi-channel piston stroke pipettes by using a pressure sensor and a vacuum pump and consist in measuring pressure raise after stopping or disconnecting the vacuum pump, the system and method does not provide a solution for measuring accurately the aspired volumes by the pipettes.

The document U.S. Pat. No. 3,962,916 describes a complicated system comprising a plurality of electronic controlled fluidic gates for the measurement of a closed air space but would be unsuitable to calibrate precisely a small volume of an aspired liquid. It is based on the use of a regulated gas supply that is needed to generate a reference pressure.

Document U.S. Pat. No. 8,561,459 describes a volume gauge comprising a chamber comprising a pressure changing device coupled to said chamber. The pressure changing device is configured to change a pressure and to measure a gas pressure of air located in the chamber. A processor having a memory stored with the total volume of the chamber and a reference pressure corresponding to an empty chamber is provided. Based on received pressure measurement data, the processor may determine the percentage volume occupied by a solid or liquid substance. Although the system disclosed in US2012/0240663 allows determining approximately the volume of a solid or liquid substance, the system is not very fast and is not accurate and may achieve at best a precision of about 1%. Also, the system is complex as requiring a pressure control system. Furthermore, in order to achieve higher accuracies, the system of US2012/0240663 would need a compensation correction for temperature variations. Also, evaporation of the liquid may be an additional source of inaccuracy.

Therefore, a better system than the ones available from prior art is required. The system should be simpler, cheaper and faster and be more reliable than existing devices. Furthermore, the precision should be at least as good or better than the precision of known liquid weighting method, which is the reference method used in the ISO standard.

There is also a requirement to be able to determine volumetric effects due to some parts of a calibration system such as the use of valves. It is also desirable to provide a system that allows to take into account effects due to hydrostatic pressure in an aspiration system.

Additionally, there is a need for a new system so that the user can easily perform calibration as often as desired without the need of a precise scale and possibly without liquid or sample solution. The new system should also be adaptable to test, in parallel, a plurality of aspiration systems during the same calibration procedure.

A new method and system should reduce the cost of ownership of laboratory pipettes and increase quality control because of its ease of use. None of the cited requirements can be achieved by existing or disclosed precise volume measurement systems.

SUMMARY OF THE INVENTION

The invention proposes a new liquid handler calibration method and a system, configured to calibrate the volume of aspired and/or dispensed substances, such as liquids, which solve the limitations of devices and calibration methods of prior art. The calibration method and device does not require liquid sample handling and is based on the measurement of gas displacement volume through the pressure change inside a closed volume. Available barometric pressure sensors have an absolute accuracy below 0.1 mbar and a short-term repeatability below 0.02 mbar. As the relative change of pressure is equal to the relative change volume, typical 0.1% absolute accuracy can be reached in displacement measurements.

The gas volume calibration method is at least as accurate as existing liquid weighting methods but it is much simpler and much faster and cheaper. Moreover, there is no need to compensate for temperature variation effects and the system does not need to avoid evaporation. Contrary to known weighting calibration techniques the user can easily perform calibration as often as desired without the need of a precise scale. In addition, as the system uses no liquid, the user can verify the functionality of the pipette and tip prior to a given measurement. The new method of the invention reduces the cost of ownership of for example laboratory pipettes and increases the quality control because of its ease of use. In addition, the method allows e.g. the detection and characterization of pipetting failure and the need of seal replacement in liquid handler devices such as pipetting devices.

The invention is achieved by the device, system and method as described in the claims.

The calibration system and method of the invention allow to take into account the volumetric effects due to the use of valves in the calibration system. Furthermore, the system allows to take into account effects due to hydrostatic pressure in an aspiration system. In embodiments, the system and method of the invention allow to calibrate, in parallel, a plurality of aspiration systems during the same calibration procedure.

BRIEF DESCRIPTION OF THE DRAWINGS

Further details of the invention will appear more clearly upon reading the following description in reference to the appended figures.

DETAILED DESCRIPTION AND EMBODIMENTS OF THE INVENTION

Figure 1:
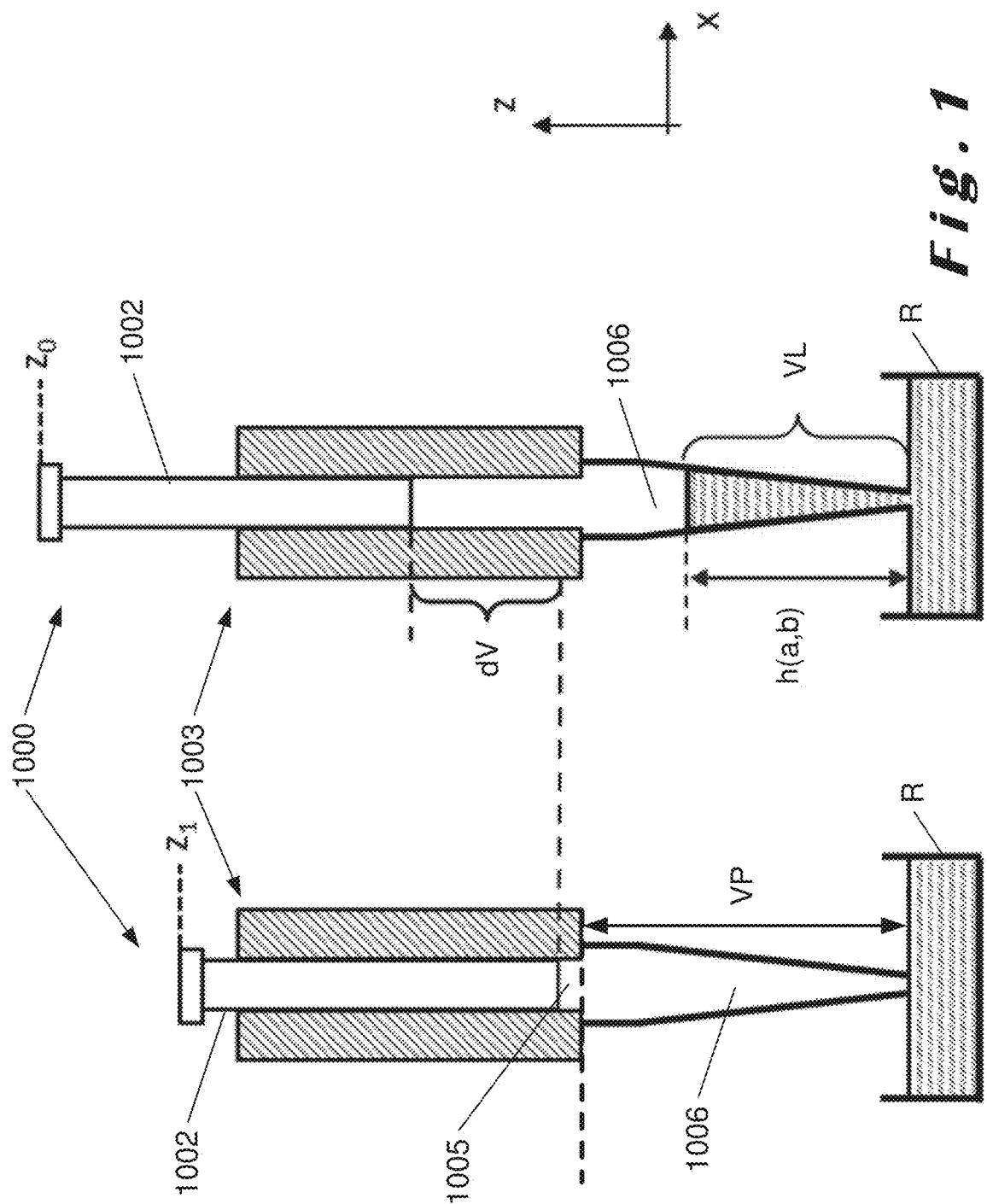
FIG. 1 shows schematically a cross section of a pipette-type aspiration device, and its use.

The present invention will be described with respect to particular embodiments and with reference to certain drawings, but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to the practice of the invention.

It is to be noticed that the term "comprising" in the description and the claims should not be interpreted as being restricted to the means listed thereafter, i.e., it does not exclude other elements.

Reference throughout the specification to "an embodiment" means that a particular feature, structure or characteristic described in relation with the embodiment is included in at least one embodiment of the invention. Thus appearances of the wording "in an embodiment", or, "in a variant", in various places throughout the description, are not necessarily all referring to the same embodiment, but several. Furthermore, the particular features, structures or characteristics may be combined in any suitable manner, as would be apparent to a skilled person from this disclosure, in one or more embodiments. Similarly, various features of the invention are sometimes grouped together in a single embodiment, figure or description, for the purpose of making the disclosure easier to read and improving the understanding of one or more of the various inventive aspects. Furthermore, while some embodiments described hereafter include some, but not other features included in other embodiments, combinations of features if different embodiments are meant to be within the scope of the invention, and from different embodiments. For example, any of the claimed embodiments can be used in any combination. It is also understood that the invention may be practiced without some of the numerous specific details set forth. In other instances, not all structures are shown in detail in order not to obscure an understanding of the description and/or the figures.

In a first aspect, the invention is achieved by a volumetric displacement calibration device 1 comprising at least one opening 3 configured to be able to adapt at least one suction system 1000, comprising a tip 1006, having a volume VP, connected to a shaft 1003 comprising a volume changing mechanism 1002 arranged to be movable between a distal position Z0 and a proximal position Z1, the proximal position Z1 being closer to said opening 3 than said distal position Z1. In an embodiment said least one suction system 1000 is a pipette and the volume changing mechanism 1002 is the piston of that pipette.

Figure 2:
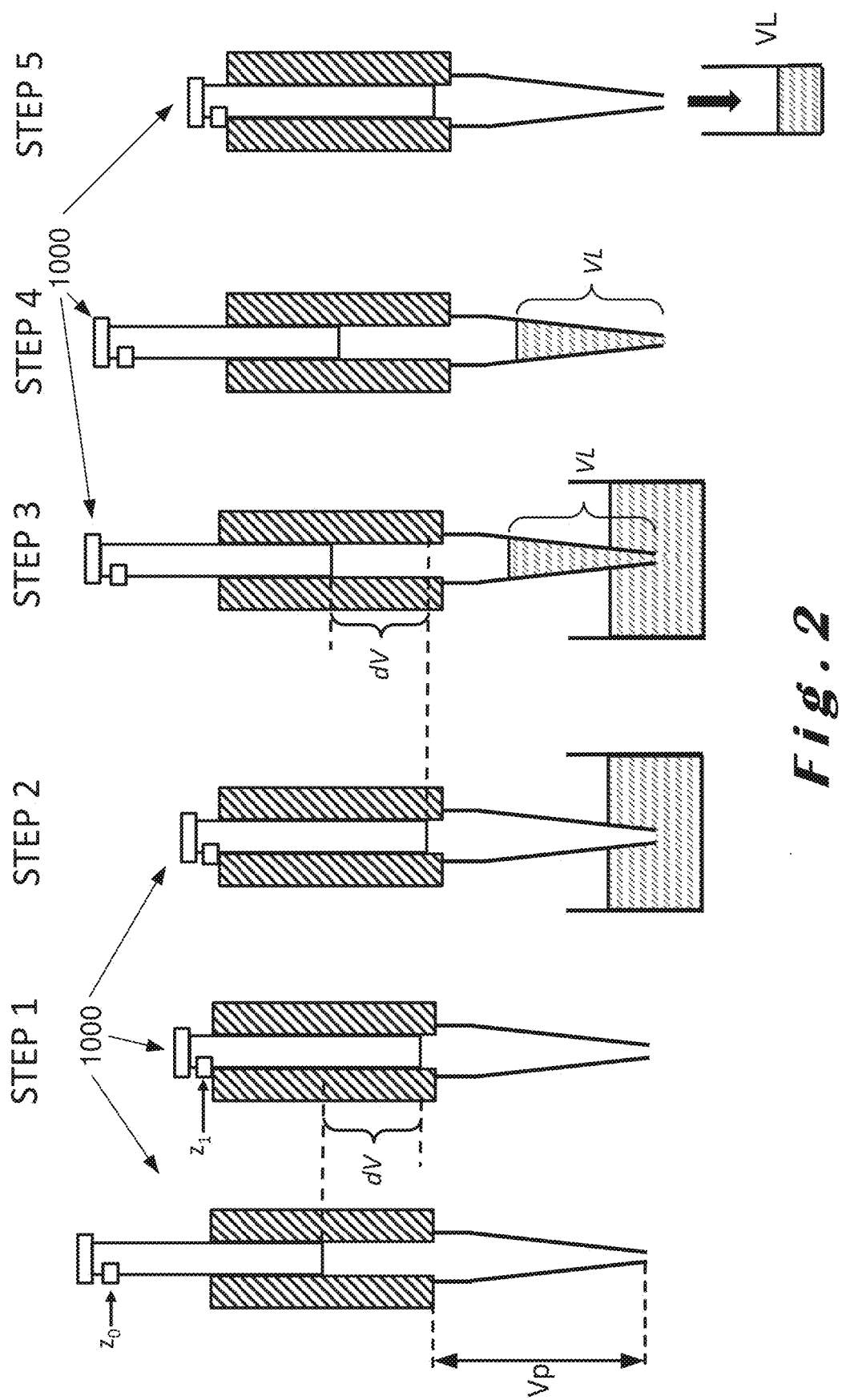
FIG. 2 shows five usual steps in the use of a pipette-type aspiration device.
Figure 3:
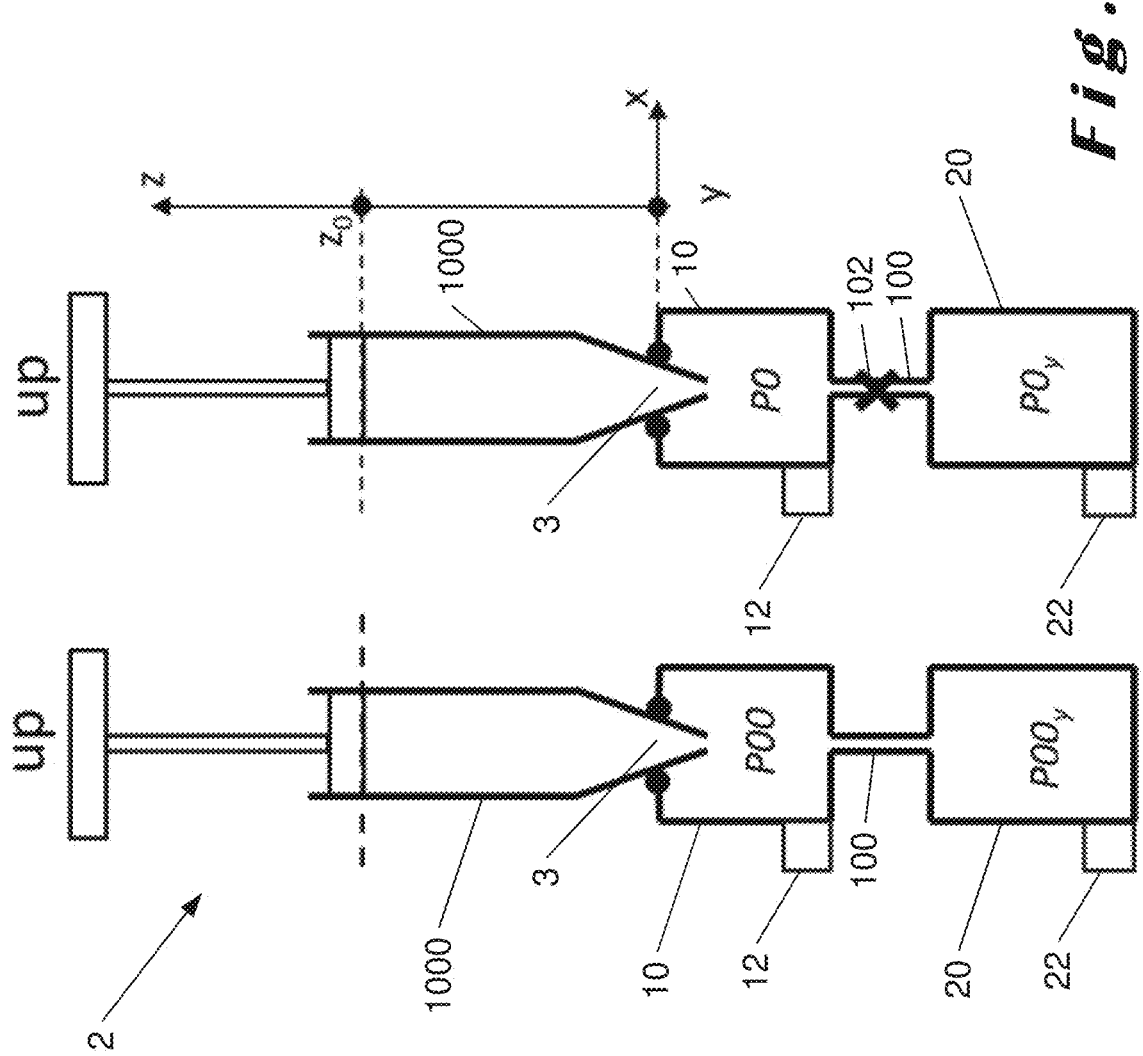
FIGS. 3 and 4 illustrate the steps of a calibration method of a calibration system comprising a single aspiration device according to the invention.
Figure 4:
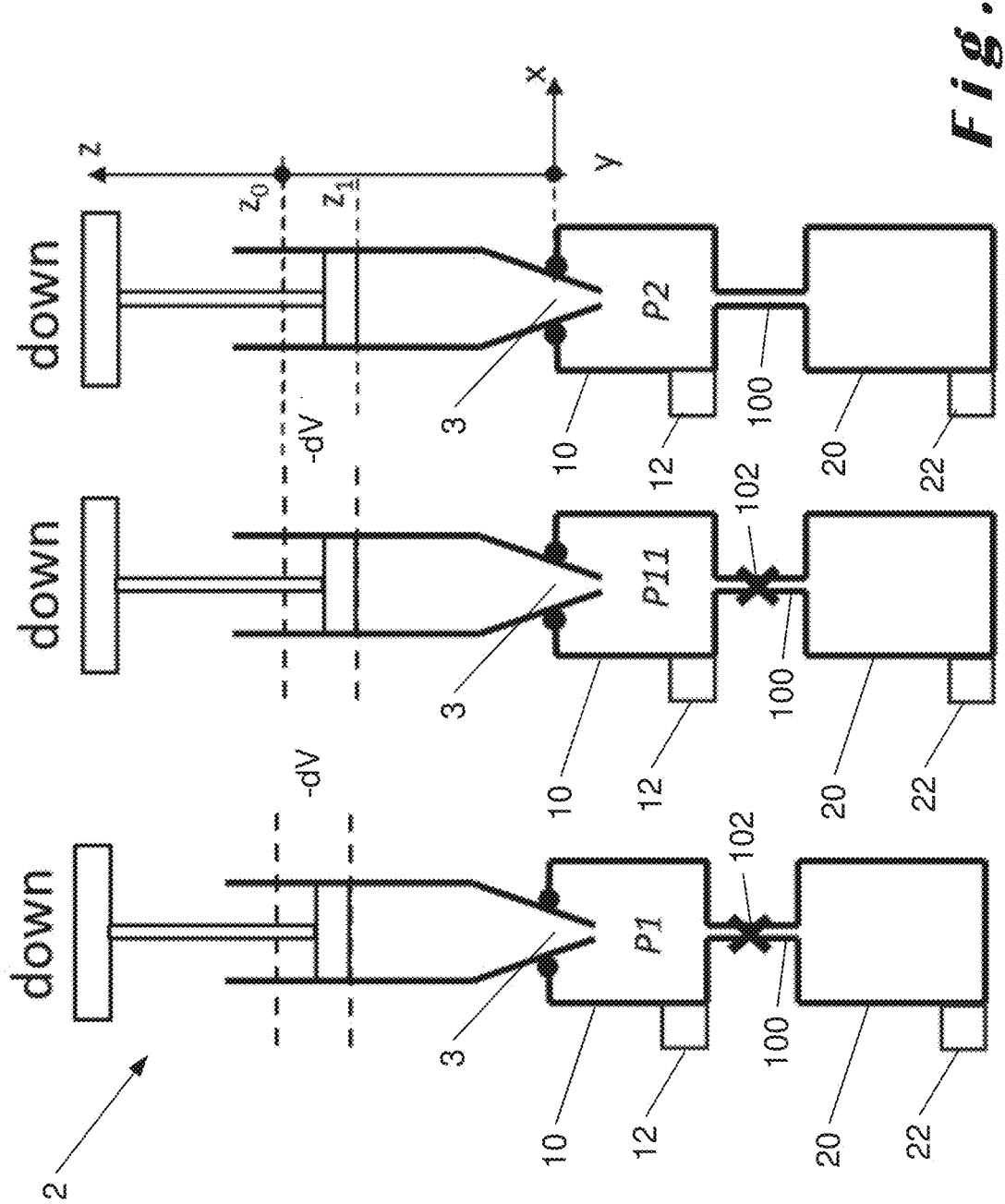
Figure 5:
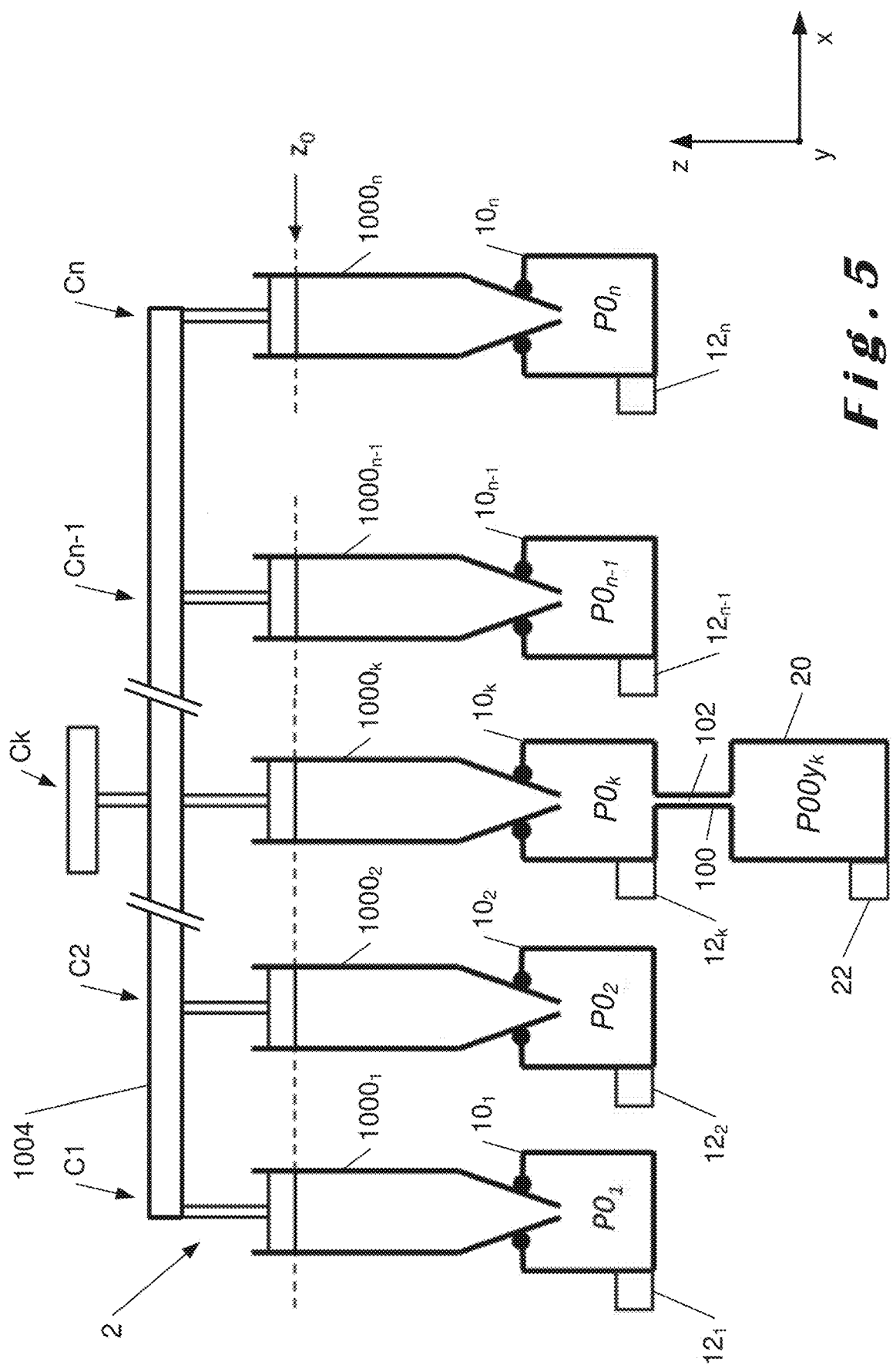
FIGS. 5 to 8 illustrate the steps of a calibration method of a calibration system comprising multiple aspiration devices according to the invention.
Figure 6:
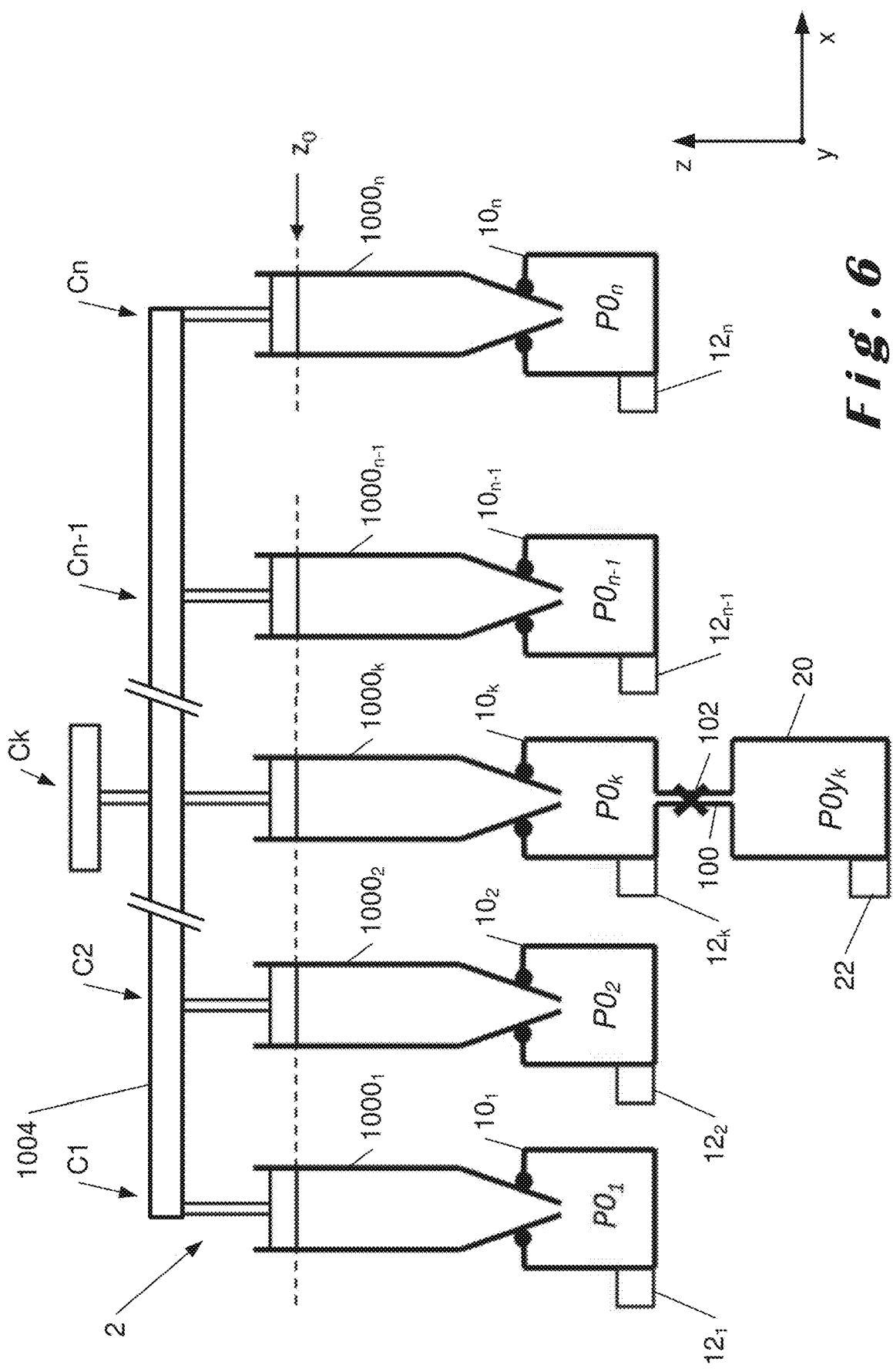
Figure 7:
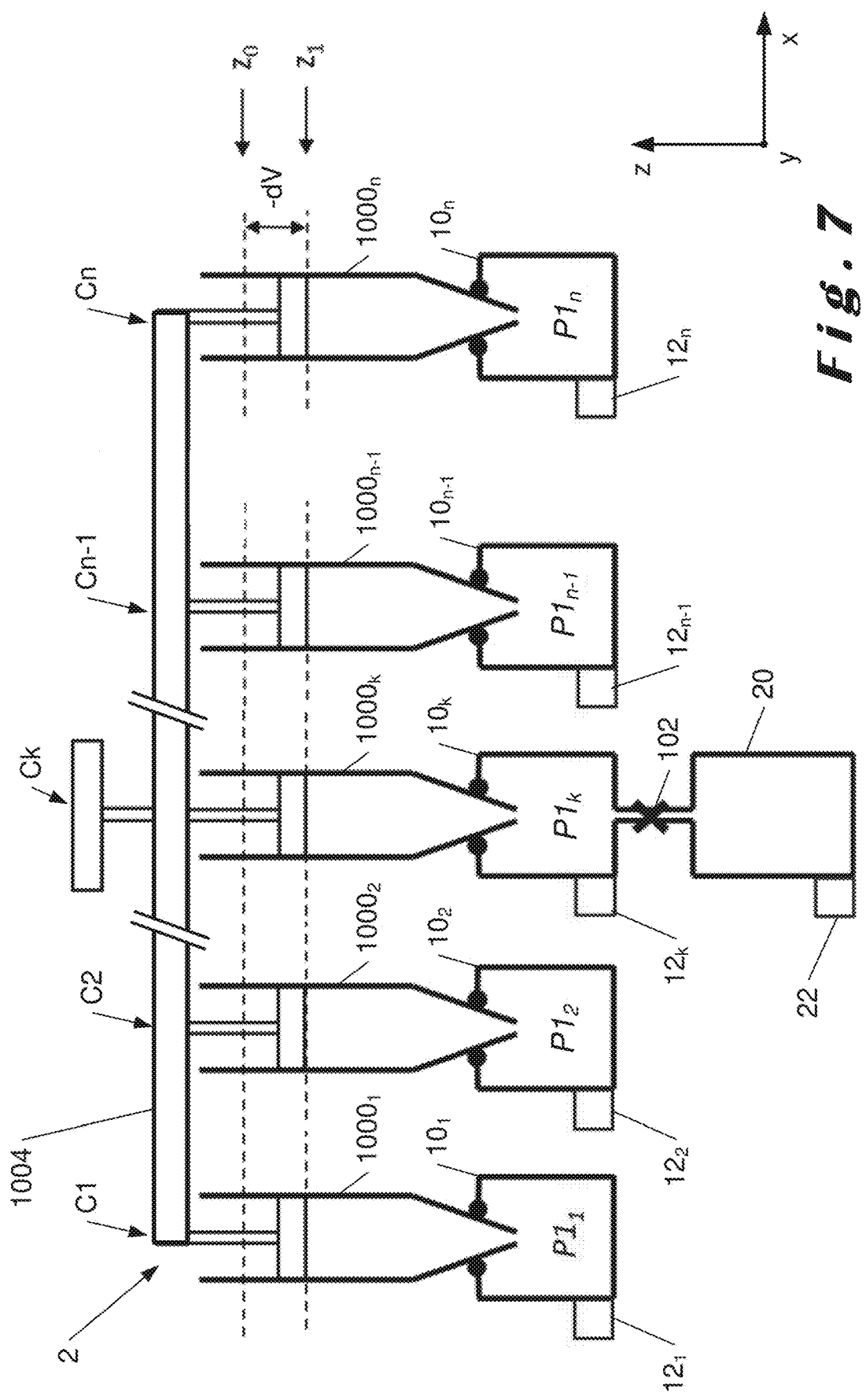
Figure 8:
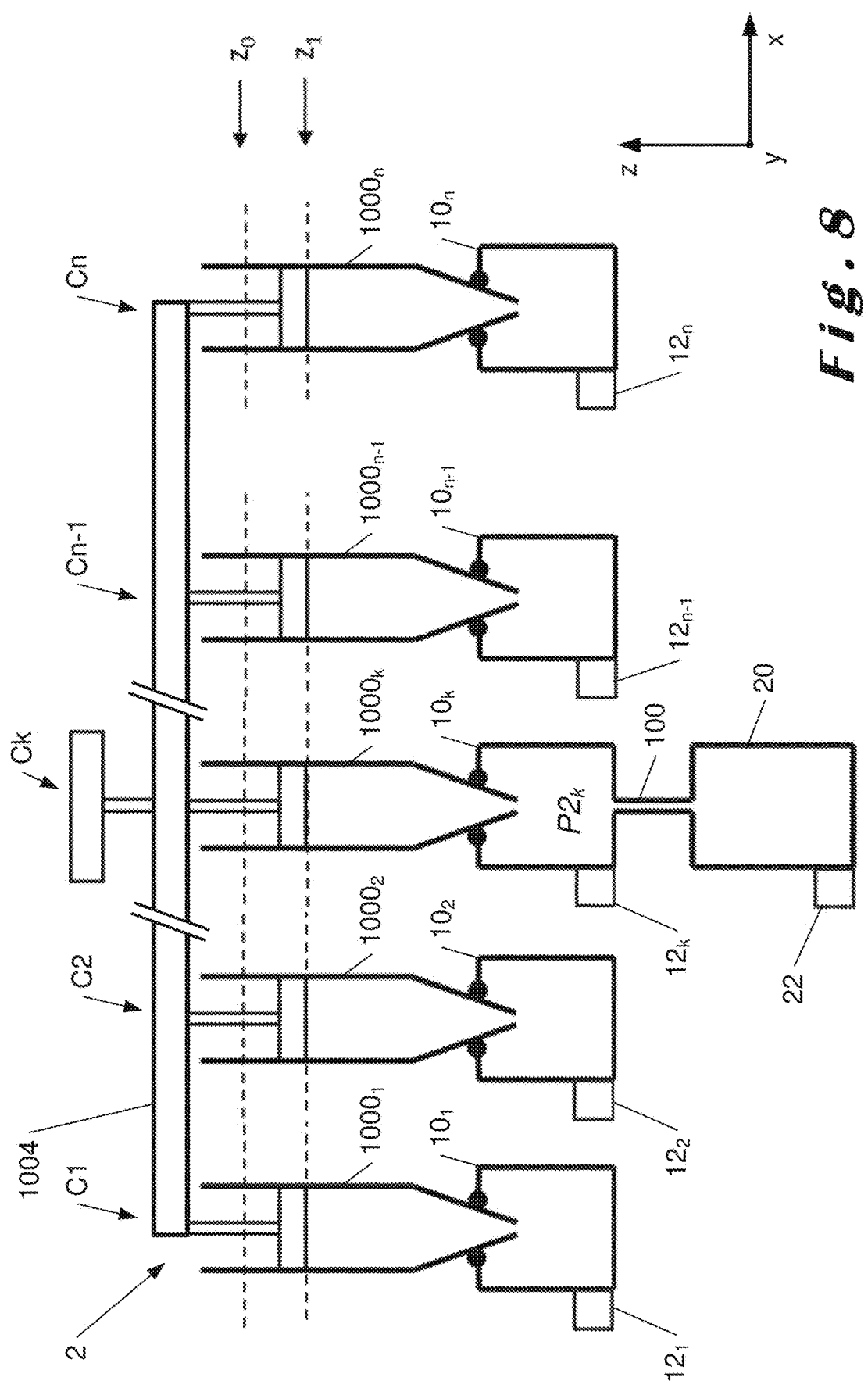
Figure 9:
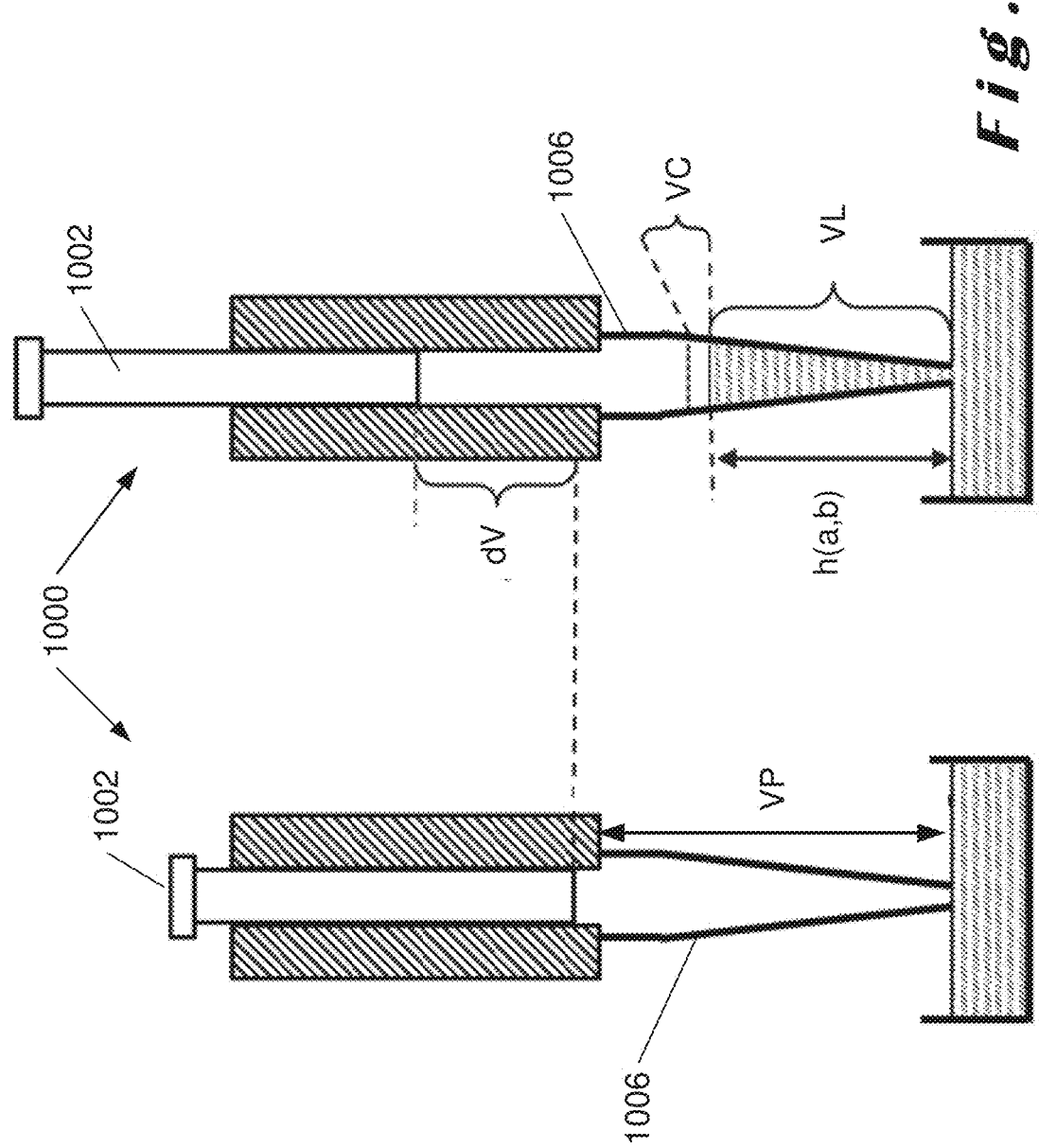
FIG. 9 illustrates the effect of hydrostatic pressure in an aspiration device, such as a pipette.

The shaft 1003 is typically an elongated tube defining a Z-axis. The negative sense of the Z-axis is defined as the sense from said distal position Z0 to said proximal position. The shaft 1003 has an internal volume that may be reduced to a remaining volume of air 1005 when the volume changing mechanism 1002 is pressed down, as illustrated in FIG. 1. FIG. 2 illustrates the main steps in the use of a pipette-type aspiration system.

The volumetric displacement calibration device 1 of the invention comprises:
- at least one main chamber 10 and one reference chamber 20, connected, by a conduct 100, to said main chamber 10;
- a valve 102 located on said conduct 100 and configured to be switchable between an open position, in which said main chamber 10 is in fluid communication with said reference chamber 20, and a closed position in which said main chamber 10 and said reference chamber 20 are not in fluid communication, the reference chamber 20 having a defined volume Vref when said valve 102 is closed;

at least one first pressure sensor 12 connected to said main chamber 10 arranged to be able to measure:

at least one pressure P00 measured in said main chamber 10 when the volume changing mechanism 1002 is in said distal position Z0 and the valve 102 opened;

at least one pressure P0 measured in said main chamber 10, when the volume changing mechanism 1002 is in the distal position Z0 and the valve 102 closed;

at least one pressure P1 measured in said main chamber 10, when the volume changing mechanism 1002 is in said proximal position Z1 and the valve 102 closed; and at least one pressure P2 measured in said main chamber 10, when the volume changing mechanism 1002 is in the proximal position Z1 and the valve 102 opened.

The volumetric displacement calibration device 1 is characterized in that it comprises:

one second pressure sensor 22 connected to said reference chamber 20 and arranged to be able to measure:

at least one pressure P00y measured in said reference chamber 20 when the volume changing mechanism 1002 is in the distal position Z0 and the valve 102 opened;

at least one pressure P0y measured in said reference chamber 20 when the volume changing mechanism 1002 is in the distal position Z0, after closure of the valve 102;

first calculation means designed to be able to calculate an internal volume Vo.

The determination of the parameter Vo is essential to the invention. This parameter Vo has the dimension of a volume and allows to provide the required calibration of the aspired volumes in the suction systems as described herein, such as pipettes.

Also, the determination of the parameter Vo is essential for determining leaks and/or to determine a compensation for hydrostatic pressures as will be described further.

The parameter Vo is defined as an internal volume and is the sum of the following 3 volumes:

the volume VP of said tip 1006;

the volume 1005 of the shaft 1003 of said at least one suction system 1000, when the volume changing mechanism 1002 is in the proximal position Z1, and the volume of said main chamber 10.

Such defined internal volume Vo is determined by:

$$Vo=Vref*(P2-Pc)/(P1-P2) \text{ wherein } Pc=P00+(P0y-P00y).$$

In an embodiment, said volumetric displacement calibration device 1 comprises second calculation means designed to be able to calculate a calibrated displacement volume dV of the suction system 1000. This calibrated displacement volume dV is determined by:

$$dV=Vo*(P1-P0)/P0.$$

In an embodiment, intended to determine volume leaks of the volumetric displacement calibration device 1, the first pressure sensor 12 is arranged to be able to measure a pressure P11 at a predetermined time t after the measurement of P1 and before opening the valve 102. In such an embodiment, the volumetric displacement calibration device 1 comprises third calculation means designed to be able to calculate a volume leak F of the device 1. The volume leak F is determined by:

$$F=Vo*(P1-P11)/(P0*t).$$

In an advantageous embodiment, the volumetric displacement calibration device 1 is configured to be able to adapt n suction systems $1000_1, 1000_2, \ldots, 1000_k, 1000_{n-1}, 1000_n$, and comprises:

n main chambers $10_1, 10_2, \ldots, 10_k, \ldots, 10_{n-1}, 10_n$, each of them being configured to be adapted to one of n suction systems $1000\text{-}1000_n$;

n first pressure sensors $12_1, 12_2, \ldots, 12_k, \ldots, 12_{n-1}, 12_n$, each first pressure sensor being connected to one main chamber $10_1\text{-}10_n$.

As will be described further, a volumetric displacement calibration system 2 defines a plurality of system channels C1-Cn. One of the system channels is predetermined as the key system channel Ck. Each comprises a main chamber $10_1, 10_2, \ldots, 10_k, \ldots, 10_{n-1}, 10_n$. However, there is, in such a system 2, only one channel that is defined as a key channel Ck, which is the only channel in the system 2 that comprises said reference chamber 20, as illustrated in FIGS. 5-8.

More precisely, in said embodiment wherein the volumetric displacement calibration device 1 is configured to be able to adapt n suction systems $1000_1, 1000_2, \ldots, 1000_k, \ldots, 1000_{n-1}, 1000_n$, only one of the n main chambers $10\text{-}10_n$ is connected to said reference chamber 20 by a conduct 100. Any main chamber $10\text{-}10_n$ of the n chambers may be chosen to be used as the main test chamber 10 and be connected to the unique reference chamber 20 of the calibration device 1. The main test channel $10_k$ is defined as the k'th main chamber, k being chosen among any predetermined number from 1 to n.

In the embodiment illustrated in FIGS. 5 to 8, the main test chamber $10_k$ is chosen as that k'th main test chamber. Said main test chamber $10_k$, in the embodiments of the FIGS. 5 to 8, is connected to said unique reference chamber 20. The main test chamber $10_k$ and the unique reference chamber measure pressures, illustrated in the steps shown in FIGS. 5 to 8, and able to determine said internal volume Vo.

In said embodiment comprising n identical main chambers, said second calculation means allow to determine a parameter Vok which has the dimension of a volume and defined as an internal volume and is the sum of the volume $VP_k$ of the tip of the k'th suction system $1000_k$, the residual volume of the shaft when the volume reduction mechanism 1004 is in the proximal position Z1 and the volume of the test chamber $10k$, and determined by:

$$Vok=Vref*(P2k-Pck)/(P1k-P2k),$$

Pck being determined by: $Pck=P00k+(P0yk-P00yk)$.

Similar to the embodiment of a single channel as described before, Vok is a parameter that is defined as an internal volume defined for said key channel Ck of the system 2, and is the sum of the following 3 volumes:

the volume VP of the aspiration tip of the suction system 1000 in said channel Ck;

the reduced volume 1005 of the shaft 1003, of the suction system 1000 in said channel Ck, when its volume change mechanism 1002 is in the distal position Z0, and the volume of the k'th main test chamber $10_k$.

In an embodiment, said volumetric displacement calibration device 1 comprises second calculation means designed to be able to calculate a calibrated displacement volume dVk of the suction system 1000 in said channel Ck. This calibrated displacement volume dVk is determined by:

$$dVk=Vok*(P1k-P0K)/P0K$$

k being a predetermined number chosen as one of 1 to n.

In said embodiment, in which all main chambers $10_1$, $10_2, \ldots, 10_k, \ldots, 10_{n-1}, 10_n$ in the device 1 have the same volume, the displacement volumes dVi of all the n suction systems $1000$-$1000_n$ is given by:

$$dVi = Vok*(P1i-P0i)/P0i, \text{ wherein } 1 \leq i \leq n.$$

In an embodiment in which not all volumes of the main chambers $10_1, 10_2, \ldots, 10_k, \ldots, 10_{n-1}, 10_n$ are identical, the difference $\Delta i$ of volumes of main chambers of all channels C1-Cn, referred to the test channel Ck are taken into account and are provided in a first lookup table.

TABLE 1 an exemplary first lookup table in which the channel 5 is the key channel, corresponding to k = 5 illustrates a typical first lookup table.

| I | 1 | 2 | 3 | 4 | 5* | 6 | 7 | 8 |
|---|---|---|---|---|----|---|---|---|
| $\Delta i$ | 13 µl | 11 µl | 12 µl | 14 µl | 0 µl | 11 µl | 13 µl | 12 µl |

The volume displacements dVi in each channel C1-Cn is computed by said second calculation means, and is determined as:

$$dVi = (Vok-Ai)*(P1i-P0i)/P0i, \text{ wherein } 1 \leq i \leq n.$$

Herein $\Delta i$, $1 \leq i \leq n$, is given by said first lookup table, illustrated in table 1, comprising the differences $\Delta i$ of the internal volumes of the $n-1$ main chambers $10_1$-$10_n$, relative to the volume of said test chamber 10, being the k'th chamber in the embodiment of FIGS. 5 to 8.

The pressure P1i is the pressure measured in the i-th main chamber $10_1$-$10_n$, wherein $1 \leq i \leq n$, when the volume change mechanism 1004 is in said proximal position Z1 and the valve 102 closed.

The pressure P0i is the pressure measured in the i-th main chamber $10_1$-$10_n$, wherein $1 \leq i \leq n$, when the volume change mechanism 1004 is in the distal position Z1 and the valve 102 closed.

In variants, the n main chambers $10_1$-$10_n$ may be arranged in a linear configuration, in the X or Y direction or in a 2D configuration, i.e. in an X-Y plane.

In embodiments, said n first pressure sensors $12_1$-$12_n$, connected to the other $n-1$ chambers, are arranged to measure a pressure P11i wherein $1 \leq i \leq n$, measured at a predetermined time t after the measurement of P1i, wherein $1 \leq i \leq n$ and before opening the valve 102. In such embodiments intended to determine leaks, said third calculation means are designed to be able to calculate the volume leaks Fi of the device 1, wherein $1 \leq i \leq n$.

In embodiments wherein all the main chambers $10$-$10_n$ have the same volume the leaks Fi are determined by:

$$Fi = Vok*(P1i-P11i)/(P0i*t), \text{ wherein } 1 \leq i \leq n.$$

In embodiments wherein all main chambers $10_1$-$10_n$ may have different volumes, the leaks Fi are determined by:

$$Fi = (Vok-Ai)*(P1i-P11i)/(P0i*t), \text{ wherein } 1 \leq i \leq n.$$

In embodiments, the volumetric displacement calibration device 1 takes into account the liquid height that induces a hydrostatic pressure due to liquid column height. This is useful If other tips than those used during the gravimetric (or dilution) calibration are used, as the effective delivered volume will deviate for the calibrated value. For a same quantity of liquid that is aspirated in the tip, the height reached by the liquid will, for example, be higher in a long and narrow tip than in short tip, both tips having the same nominal volume. This liquid height induces a hydrostatic pressure due to liquid column height and therefore induces a small, but not negligible, offset dVc between the effective aspirated volume VL and the true displacement volume of the piston of the pipette.

In such an embodiment, the calibration device 1 comprises a second look-up table which contains the information of the liquid heights hi for different models of aspiration tips 1006 and for each defined liquid volume VL to be tested. In such an embodiment, the volumetric displacement calibration device 1 comprising fourth calculation means that are designed to be able to calculate a volumetric compensation Vci of the gravimetric effect, for all of the aspiration tips.

The volumetric compensation Vci of the gravimetric effect is determined by knowing the parameter Vo and by taking into account said second look-up table h(a,b). Such a second lookup table has two dimensions: tip models and the test volumes, in percentage of the nominal tip volumes.

In the table h(a,b), a is the nominal volume of the pipette and b the tested volume. The values of b and y are entered by the user into a test machine before performing a calibration.

TABLE 2 an exemplary second look-up table h(a, b)

| a | b | | |
|---|---|---|---|
| | 100% VL | 50% VL | 10% VL |
| TIP 1000 µl | 50 mm | 34 mm | 17 mm |
| TIP 200 µl | 40 mm | 29 mm | 10 mm |
| TIP 100 µl | 29 mm | 22 mm | 10 mm |
| TIP 20 µl | 22 mm | 14.5 mm | 6.5 mm |
| TIP 10 µl | 14.5 mm | 10 mm | 4.5 mm |

In an embodiment of a system 2 with a single test channel, the volumetric compensation Vc of the gravimetric effect is determined by:

$$Vc = -h(a,b)*w*g*Vo/P0,$$

wherein a covers the ranges of tip sizes and b covers the range of tested volumes in each size.

The displaced volume is the determined by:

$$VL = dV-Vc.$$

In an embodiment of a system 2 with a plurality of test channels C1-Cn, the volumetric compensation Vc of the gravimetric effect is determined by:

$$Vli = dVi-Vc, \text{ wherein } 0 \leq i \leq n.$$

In another aspect, the invention is also achieved by a volumetric displacement calibration system 2 that comprises at least one volumetric displacement calibration device 1, as described herein, and at least one suction system $1000_1$, $1000_2, \ldots, 1000_k, \ldots, 1000_{n-1}, 1000_n$ adapted to said at least one volumetric displacement calibration device 1. The suction systems $1000_1$-$1000_n$ are preferably pipettes but not necessarily so.

In an embodiment, illustrated in FIGS. 5-8, a volumetric displacement calibration system 2 comprises n channels C1-Cn comprises a volume change mechanism 1004 which is common to all of said suction systems $1000_1$, $1000_2, \ldots, 1000_k, \ldots, 1000_{n-1}, 1000_n$. When a volumetric displacement calibration system 2 comprises n channels C1-Cn, there is still only one reference chamber 20 arranged to a n main chambers $10_1$-$10_n$.

Figure 10:
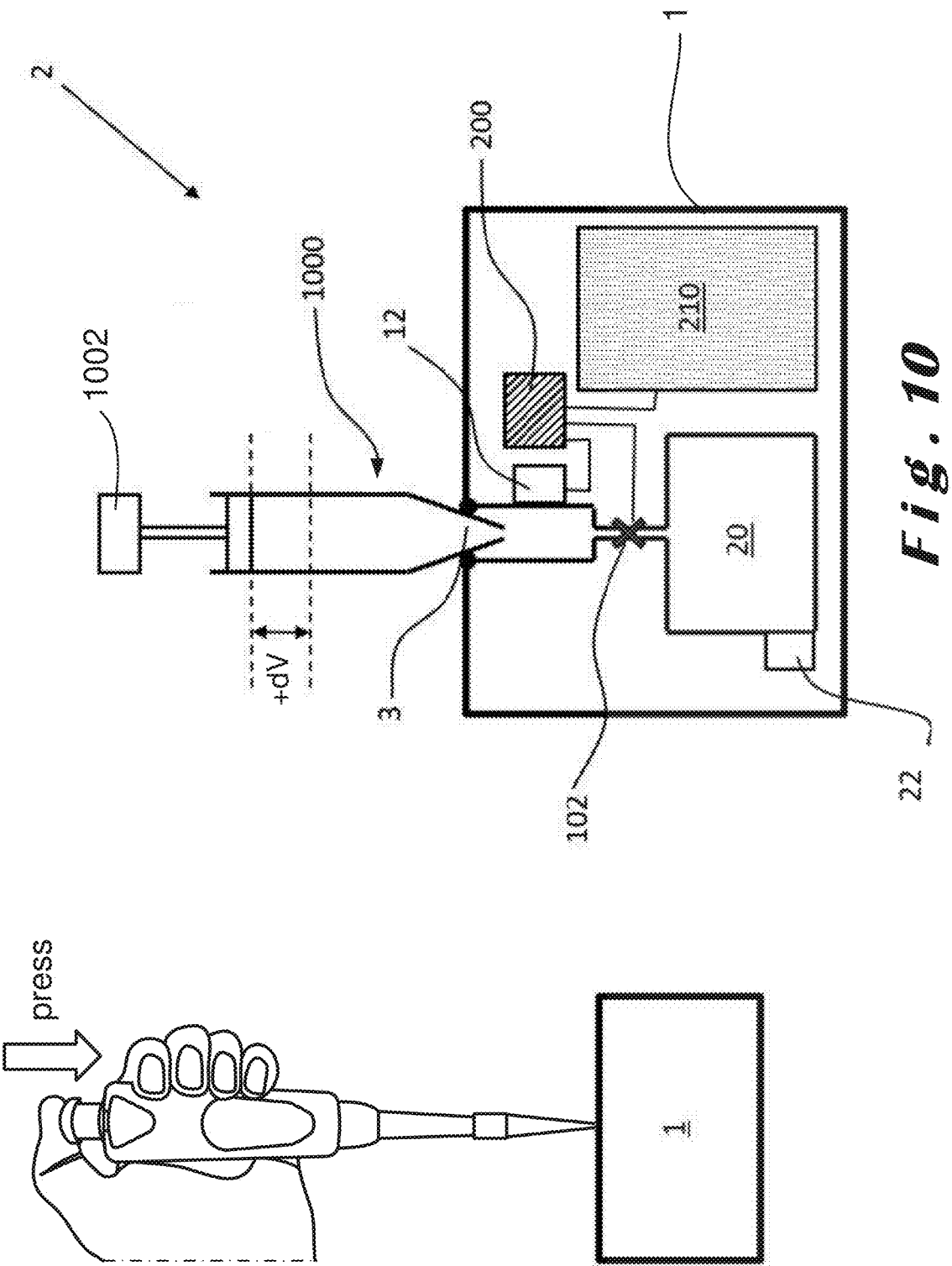
FIG. 10 illustrates a calibration system according to the invention.
Figure 11:
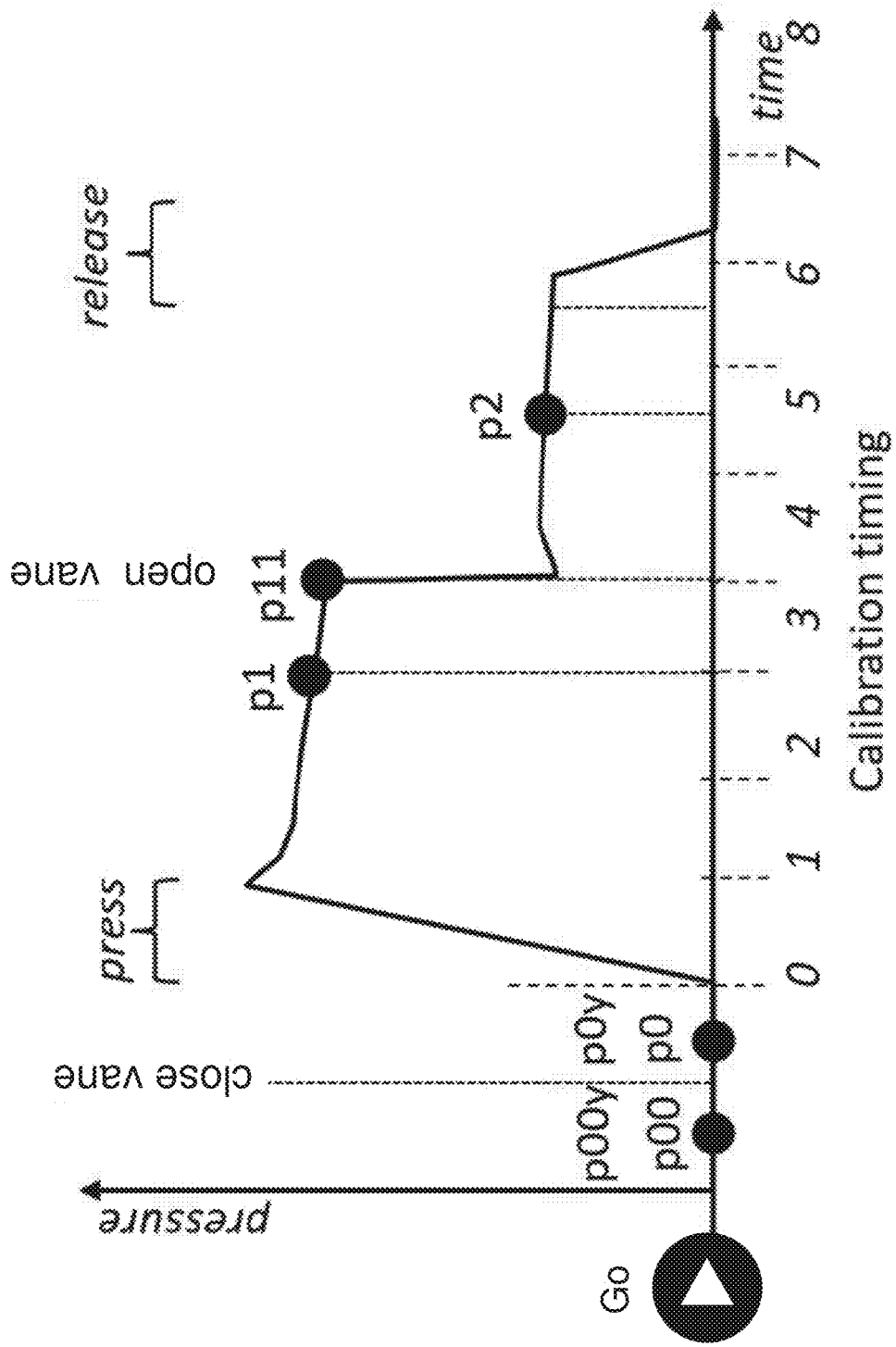
FIG. 11 shows schematically different steps in a calibration procedure of a liquid handling device according to the invention.

FIG. 10 illustrates a volumetric displacement calibration system 2 comprising also a computer 210 and a display 200.

The computer comprises means to enable to execute said first, second, third and fourth calculations.

In another aspect, the invention is also achieved by a method for calibrating a volumetric fluid handling system 2 and comprises successive steps (a-l), consisting of:
- a) providing a volumetric displacement calibration device 1 as described herein;
- b) connecting said suction system 1000 to said main chamber 10 while said valve 102 is in said open position;
- c) measuring an initial pressure P00 in said main chamber 10 with said at least one first pressure sensor 12;
- d) measuring an initial pressure P00y in said second chamber 20 with said second pressure sensor 20;
- e) close said valve 102;
- f) measuring the pressure P0 in said main chamber 10 with said at least one first pressure sensor 12;
- g) measuring the pressure P0y in said reference chamber 20 with said second pressure sensor 22;
- h) lowering the volume change mechanism 1002 by a predetermined stroke $\Delta Z$ and reducing the volume of air in said suction system 1000;
- i) measuring the pressure P1 in said main chamber 10 with said at least one first pressure sensor 12;
- j) opening said valve 102;
- k) measuring the pressure P2 in said main chamber 10 with said at least one first pressure sensor 12;
- l) determining an internal volume Vo, being a parameter that is the sum of the volume VP of said aspiration tip 2006, the residual volume 1005 of the shaft 1003 and the volume of said main chamber 10. This internal Vo is determined by:

$$Vo = Vref^*(P2-Pc)/(P1-P2), \text{ wherein } Pc = P00 + (P0y - P00y).$$

In an advantageous embodiment, the method comprises a step m) of determining the calibrated displacement volume dV, calculated by $dV = Vo^*(P1-P0)/P0$.

In an embodiment, intended to measure leaks, the method comprises a step n), after step i, of measuring the pressure P11 in said first chamber 12, after a predetermined time t, with said valve 102 closed, the volume leak F being determined by the relationship:

$$F = Vo^*(P1-P11)/(P0^*t).$$

In embodiments, the method for calibrating a volumetric fluid handling system 2 comprising a plurality of n suction systems $1000_1$-$1000_n$, comprises successive steps (a'-m') consisting of:
- a') providing a volumetric displacement calibration device 1 comprising n main chambers $10_1$, $10_2$, ..., $10_k$, ..., $10_{n-1}$, $10_n$ as described and defining one of the suction systems $1000_1$-$1000_n$ as the k'th and key test suction system 1000. In FIGS. 5-8 the k'th chamber $10_k$ is the test main chamber. The number k is chosen among one of 1 to n. The volumetric fluid handling system defines measurement channels C1-Cn. Each channel comprises a suction system $1000$-$1000_n$ connected to a main chamber $10_1$, $10_2$, ..., $10_k$, ..., $10_{n-1}$, $10_n$;
- b') providing a first look-up table, as described herein, comprising the differences $\Delta i$, wherein $1 \leq i \leq n$—of the internal volumes of the n main chambers, relative to the volume of said test chamber $10_k$;
- c') connecting all the suction systems $1000_1$, $1000_2$, ..., $1000_k$, ..., $1000_{n-1}$, $1000_n$ to the main chambers $10_1$, $10_2$, ..., $10_k$, ..., $10_{n-1}$, $10_n$ while said valve 102 is in said open position, the k'th test suction system 1000 being connected to the k'th test chamber $10_k$ which is connected to said reference chamber 20 by a conduct 100;
- d') measuring an initial pressure P00k in said k'th test chamber $10_k$ with said at least one first pressure sensor $12_k$;
- e') measuring an initial pressure P00yk in said reference chamber 20 with said second pressure sensor 20;
- f') closing said valve 102;
- g') measuring the pressure P0K in said k'th test chamber $10_k$ with said at least one first pressure sensor $12_k$;
- h') measuring the pressure P0yk in said reference chamber 20 with said second pressure sensor 22;
- i') lowering the volume change mechanisms of all the suction systems $1000$-$1000^v$ by a common volume change mechanism 2004 and by a predetermined stroke $\Delta Z$ and reducing the volume of air in all of said suction systems $1000_1$, $1000_2$, ..., $1000_k$, ..., $1000_{n-1}$, $1000_n$;
- j') measuring the pressure P1k in said test chamber $10_k$ with said at least one first pressure sensor 12;
- k') opening said valve $10_2$;
- l') measuring the pressure P2k in said test chamber $10_k$ with said at least one first pressure sensor $12_k$;
- m') determining an internal volume Vok, being the sum of the volume of the k'th tip, the volume of the k'th shaft when the volume change mechanism is in the distal position Z0, and the volume of said k'th main chamber 10.

The internal volume Vok is determined by:

$$Vok = Vref^*(P2k-Pck)/(P1_k-P2k), \text{ wherein}$$
$$Pck = P00k + (P0yk - P00yk).$$

In embodiments, the method comprises a step n') consisting in determining the calibrated displacement volume dV of the test suction system, calculated by $dVk = Vok^*(P1k-P0k)/P0k$, and determining the calibrated displacement volumes dVi, wherein $1 \leq i \leq n$, of all the other suction system $1000_1$-$1000_n$. This is preferably done by using said first look-up table, the volumes dVi being determined by:

$$dVi = (Vok - \Delta i)^*(P1i - P0i)/P0i.$$

In embodiments, wherein all main chambers $10_1$-$10_n$ have the same volume the method comprises the steps (o'-q') of:
- o') measuring the pressure P11 in the k'th main chamber $10_k$, after a predetermined time t, with said valve 102 closed;
- p') measuring the pressures P11i in all the main chambers $10_1$-$10_n$, at a predetermined time t after the measurement of P1i, and before opening the valve 102,
- q') calculating the volume leak Fi of all the main chambers $10_1$-$10_n$, Fi being determined by:

$$Fi = Vok^*(P1i - P11i)/(P0i^*t), \text{ wherein } 1 \leq i \leq n.$$

As explained before, the pressure P1i is the pressure measured in the i-th main chamber $10_1$-$10_n$, wherein $1 \leq i \leq n$, when the volume change mechanism 1004 is in said proximal position Z1 and the valve 102 closed. The pressure P2i is the pressure measured in the i-th main chamber $10_1$-$10_n$, wherein $1 \leq i \leq n$, when the volume change mechanism 1004 is in the proximal position Z1 and the valve 102 opened.

In an embodiment, the method comprises a step r' consisting of providing a second look-up table which contains the information of the liquid heights hi for different models of aspiration tips 1006 and for each defined liquid volume VL to be tested, and calculating a volumetric compensation Vci of the gravimetric effect, by taking into account said second look-up table, as described herein, by:

$$Vc=-h(a,b)*w*g*Vo/P0.$$

Said step r' comprises also the calculation of the corrected displaced volumes VLi being determined by:

$$VLi=dV-Vci, \text{ wherein } 0\le i\le n \text{ in the case of an embodiment of a system comprising a single test channel.}$$

In an embodiment of a system 2 comprising a plurality of test channels C1-Cn, the volumetric compensation Vc of the gravimetric effect is determined by:

$$VLi=dVi-Vc, \text{ wherein } 0\le i\le n.$$

In embodiments, in order to improve further the precision of the calibration process, the different steps of measuring the pressures in the main chambers and the reference chamber may be repeated so that mean values may be obtained.

The invention claimed is:

1. A volumetric displacement calibration device comprising:
   at least one opening configured to adapt at least one suction system, comprising a tip, having a volume, connected to a shaft comprising a volume change mechanism configured to be movable between a distal position and a proximal position closer to said opening than said distal position;
   at least one main chamber and one reference chamber, connected, by a conduit, to said at least one main chamber;
   a valve disposed on said conduit and configured to be switchable between an open position, in which said main chamber is in fluid communication with said reference chamber, and a closed position in which said main chamber and said reference chamber are not in fluid communication, the reference chamber having a defined volume Vref when said valve is closed;
   at least one first pressure sensor connected to said main chamber, the at least one first pressure sensor being configured to measure:
      at least one pressure P00 measured in said main chamber when the volume change mechanism is in said distal position and the valve is opened,
      at least one pressure P0 measured in said main chamber, when the volume change mechanism is in the distal position and the valve is closed,
      at least one pressure P1 measured in said main chamber when the volume change mechanism is in said proximal position and the valve is closed, and
      at least one pressure P2 measured in said main chamber, when the volume change mechanism is in the proximal position and the valve is opened;
   one second pressure sensor connected to said reference chamber and configured to measure:
      at least one pressure P00y measured in said reference chamber when the volume change mechanism is in the distal position and the valve is opened, and
      at least one pressure P0y measured in said reference chamber when the volume change mechanism is in the distal position, after closure of the valve; and
   a first calculator configured to calculate an internal volume which is the sum of the volume of said tip, a residual volume of the shaft when the volume change mechanism is in the proximal position, and a volume of said main chamber, said internal volume being determined by:

$$Vo=Vref*(P2-Pc)/(P1-P2),$$

wherein Pc=P00+(P0y−P00y),
   Vo is the internal volume, and
   Vref is the defined volume of the reference chamber when the valve is closed.

2. The volumetric displacement calibration device according to claim 1, further comprising a second calculator configured to calculate a calibrated displacement volume of the suction system by the following formula:

$$dV=Vo*(P1-P0)/P0,$$

where dV is the calibrated displacement volume.

3. The volumetric displacement calibration device according to claim 1, wherein the first pressure sensor is configured to measure a pressure P11 at a predetermined time t after the measurement of the at least one pressure P1 and before opening the valve, said device further comprising another calculator configured to calculate a volume leak of the device by the following formula:

$$F=Vo*(P1-P11)/(P0*t).$$

4. The volumetric displacement calibration device according to claim 1, wherein the volumetric displacement calibration device is configured able to adapt n suction systems,
   wherein the at least one main chamber comprises n main chambers, each of the n main chambers being configured to be adapted to one of the n suction systems,
   the at least one first pressure sensor comprises n first pressure sensors, each of the first pressure sensors being connected to a respective main chamber,
   wherein one of the n main chambers that is the k'th main chamber is connected to said reference chamber by the conduit, said k'th main chamber connected to said reference chamber being a test chamber, said k'th main chamber being configured to be adapted to the k'th suction system, the reference chamber and the k'th main chamber being configured to measured pressures in order to be able to determine a parameter Vok, which is the sum of the volume $VP_k$ of the tip of the k'th suction system, the residual volume of the shaft when the volume change mechanism is in the proximal position, and the volume of the k'th main chamber, Vok being determined by:

$$Vok=Vref*(P2k-Pck)/(P1_k-P2k),$$

Pck being determined by: Pck=P00k+(P0yk−P00yk), wherein
   P00k is the pressure measured by the first pressure sensor in said k'th main chamber when the volume change mechanism is in said distal position and the valve is opened,
   P0k is the pressure measured by the first pressure sensor in said k'th main chamber, when the volume change mechanism is in the distal position and the valve is closed,
   P1k is the pressure measured by the first pressure sensor in said k'th main chamber, when the volume change mechanism is in said proximal position and the valve is closed,
   P2k is the pressure measured by the first pressure sensor in said k'th main chamber, when the volume change mechanism (1004) is in the proximal position and the valve is opened,
   P00yk is the pressure measured by the second pressure sensor in said reference chamber when the volume change mechanism is in the distal position and the valve is opened, and P0yk is the pressure measured by the second pressure sensor in said reference chamber when the volume change mechanism is in the distal position, after closure of the valve.

5. The volumetric displacement calibration device according to claim 4, wherein said second calculator is configured to calculate calibrated displacement volumes dVi:
    when all the suction systems are connected to n identical main chambers, the calibrated displacement volumes dVi are determined by:

$dVik=Vok*(P1k-P0k)/P0k$, for said $k$'th suction system, $dVi=Vok*(P1i-P0i)/P0i$, for the other suction systems, when the volumes of the main chambers are not identical and their differences Δi, relative to the volume of the k'th main chamber, being provided by a look-up table, the volumes dVi are determined by:

$dVi=(Vok-\Delta i)*(P1i-P0i)/P0i$, wherein $1 \le i \le n$, and

P1$i$ is the pressure measured in the i-th main chamber, wherein $1 \le i \le n$, when the compression mechanism is in said proximal position Z1 and the valve is closed, and
    P0$i$ is the pressure measured in the i-th main chamber, wherein $1 \le i \le n$, when the compression mechanism is in the distal position Z1 and the valve is closed.

6. The volumetric displacement calibration device according to claim 4, wherein said n first pressure sensors, are configured to measure a pressure P11$i$, measured at a predetermined time t after the measurement of P1$i$, before opening the valve, the third calculation means calculator being configured to calculate the volume leaks Fi of the device,
    wherein $1 \le i \le n$ and determined by:

$Fi=Vok*(P1i-P11i)/(P0i*t)$.

7. The volumetric displacement calibration device according to claim 2, further comprising:
    a look-up table h(a,b) which contains information of liquid heights for different models of aspiration tips and for each defined liquid volume to be tested; and
    another calculator configured to calculate a volumetric compensation Vci of the gravimetric effect, for all of said aspiration tips, by taking into account said look-up table, by the formula:

$Vci=-h(a,b)*w*g*Vo/P0$;

said other calculator being configured to calculate corrected displaced volumes VLi determined by:

$VLi=dVi-Vci$, wherein $0 \le i \le n-1$.

8. A volumetric displacement calibration system comprising:
    at least one volumetric displacement calibration device according to claim 1; and
    at least one suction system adapted to said at least one volumetric displacement calibration device.

9. The volumetric displacement calibration system according to claim 8, further comprising a volume change mechanism which is common to all of said n suction systems.

10. A method for calibrating a volumetric fluid handling system comprising successive steps comprising:
    a) providing the volumetric displacement calibration device according to claim 1;
    b) connecting said suction system to said main chamber while said valve is in said open position;
    c) measuring an initial pressure P00 in said main chamber with said at least one first pressure sensor;
    d) measuring the at least one pressure P00$y$ in said reference chamber with said second pressure sensor;
    e) closing said valve;
    f) measuring the at least one pressure P0 in said main chamber with said at least one first pressure sensor;
    g) measuring the at least one pressure P0$y$ in said reference chamber with said second pressure sensor;
    h) lowering the volume change mechanism by a predetermined stroke and reducing the volume of air in said suction system;
    i) measuring the pressure P1 in said main chamber with said at least one first pressure sensor;
    j) opening said valve;
    k) measuring the at least one pressure P2 in said main chamber with said at least one first pressure sensor;
    l) Determining the internal volume Vo that is a parameter that is the sum of the volume of said tip, the residual volume of the shaft when the volume change mechanism is in said proximal position, and the volume of said main chamber, Vo being determined by:

$Vo=Vref*(P2-Pc)/(P1-P2)$, wherein $Pc=P00+(P0y-P00y)$.

11. The method for calibrating the volumetric fluid handling system according to claim 10, further comprising a step m) of determining the calibrated displacement volume dV, calculated by $dV=Vo*(P1-P0)/P0$.

12. The method for calibrating the volumetric fluid handling system according to claim 10, further comprising:
    a step of determining a volume leak F; and
    a step n), after step i, of measuring the pressure P11 in said first chamber, after a predetermined time t, with said valve closed, the volume leak F being determined by the relationship: $F=Vo*(P1-P11)/(P0*t)$.

13. A method for calibrating a volumetric fluid handling system including a plurality of suction systems, the method comprising successive steps comprising:
    a') providing the volumetric displacement calibration device comprising the n main chambers according to claim 4 and defining the k'th main chamber as the test chamber;
    b') providing a first look-up table comprising the differences Δi of the internal volumes of the n main chambers relative to the volume of said k'th main chamber;
    c') connecting all the suction systems to the n main chambers while a valve is in an open position, the test suction system being connected to the test chamber which is connected to said reference chamber by a conduit;
    d') measuring an initial pressure P00$k$ in said k'th main chamber with the respective first pressure sensor connected to said k'th main chamber;
    e') measuring an initial pressure P00$y$ in said reference chamber with said second pressure sensor;
    f') closing said valve;
    g') measuring the pressure P0$k$ in said k'th chamber with the respective first pressure sensor connected to said k'th main chamber;
    h') measuring the pressure P0$yk$ in said reference chamber with said second pressure sensor;
    i') lowering volume change mechanisms of all the suction systems by a common volume reduction mechanism and by a predetermined stroke $\Delta Z$ and reducing the volume of air in all of said suction systems;

j') measuring the pressure P1$k$ in said k'th main chamber with the respective first pressure sensor connected to said k'th main chamber;

k') opening said valve;

l') measuring the pressure P2$k$ in said k'th main chamber with the respective first pressure sensor connected to said k'th main chamber;

m') determining the parameter Vo$k$, which is the sum of the volume VP$_k$ of the tip of the k'th suction system, the residual volume of the shaft when the volume change mechanism is in the proximal position, and the volume of said k'th main chamber, determined by:

$$Vok = Vref*(P2k-Pck)/(P1_k-P2k),$$

wherein Pck=P00$k$+(P0$y k$−P00$y k$).

14. The method according to claim 13, further comprising the steps (o'-q') of:

o') measuring the pressure P11 in the k'th main chamber, after a predetermined time t, with said valve closed;

p') measuring the pressures P11$i$ in all main chambers, at a predetermined time t after the measurement of P1$i$, wherein 1≤i≤n, and before opening the valve;

q') calculating the volume leaks Fi of all main chambers, Fi being determined by:

$$Fi = Vok*(P1i-P11i)/(P0i*t), \text{ wherein } 1 \le i \le n.$$

15. The method according to claim 14, further comprising a step r' comprising:

providing a second look-up table which contains the information of the liquid heights hi for different models of aspiration tips and for each defined liquid volume VL to be tested, calculating a volumetric compensation Vci of the gravimetric effect, by taking into account said second look-up table by:

$$Vci = -hi*w*g*Vo/P0, \text{ and}$$

calculating corrected displaced volumes VL$_i$ being determined by:

$$VL_i = dV_i - Vci, \text{ wherein } 0 \le i \le n.$$

16. The method according to claim 13, further comprising:

n') determining a calibrated displacement volume dV of the k'th test suction system, calculated by dVk=Vok* (P1$k$−P0$k$)/P0$k$, and determining the calibrated displacement volumes dVi, wherein 1≤i≤n of all the other suction systems, by using said first look-up table, the volumes dVi being determined by:

$$dVi = (Vok - \Delta i)*(P1i - P0i)/P0i.$$

* * * * *